United States Patent [19]

Patten

[11] 3,917,913

[45] Nov. 4, 1975

[54] TELEPHONE CALLING SIGNAL TRANSLATING CIRCUITRY

[75] Inventor: Michael Allen Patten, San Jose, Calif.

[73] Assignee: International Business Machines Corporation, Armonk, N.Y.

[22] Filed: June 3, 1974

[21] Appl. No.: 475,680

[52] U.S. Cl. .......................... 179/84 VF; 179/16 EC

[51] Int. Cl.$^{2}$ .......................... H04M 1/50

[58] Field of Search ....... 179/18 ET, 18 EB, 16 EC, 179/84 VF, 15 BY

[56] References Cited

UNITED STATES PATENTS

| | | | |
|---|---|---|---|
| 3,366,778 | 1/1968 | De Stefano | 179/18 EB |
| 3,710,028 | 1/1973 | Pitroda | 179/15 BY |
| 3,725,598 | 4/1973 | Braun | 179/18 EB |
| 3,851,110 | 11/1974 | Kelly | 179/18 EB |

*Primary Examiner*—Kathleen H. Claffy
*Assistant Examiner*—Joseph Popek
*Attorney, Agent, or Firm*—George E. Roush

[57] ABSTRACT

Relatively high level telephone dialing pulse calling signals are rendered accordant with electronic telephone tone calling signals by circuitry for discerning and counting dialing pulses differentiated in passing direct current blocking circuit components present in the low level alternating current tone call signalling sub-system. A Multi-Frequency Receiver (MFR) and other conventionally associated circuitry for "Touch-Tone" call signalling and the disclosed rotary dial digit detecting and counting circuitry are integrated so that either rotary-dial or touch-tone calling signals are handled automatically in response to either type regardless of which type is presented.

8 Claims, 3 Drawing Figures

TELEPHONE CALLING SIGNAL TRANSLATING CIRCUITRY

Figure 1:
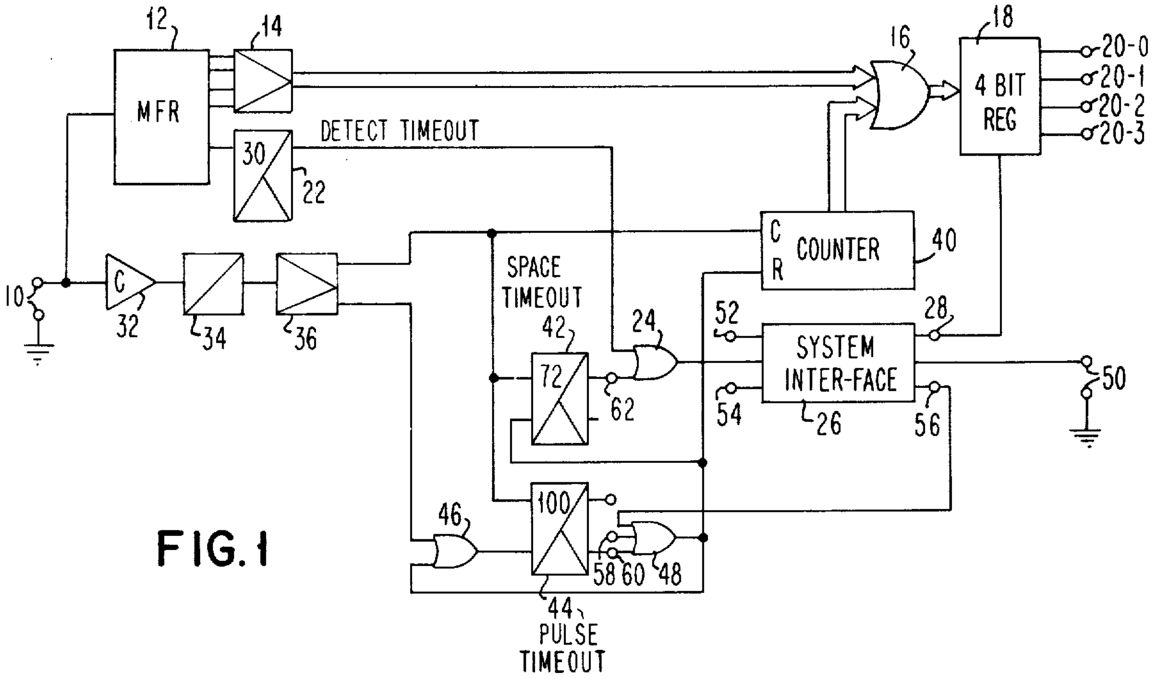

The instant application stems from the same endeavors that resulted in the copending U.S. patent application Ser. No. 475,681 of Michael Allen Patten filed on June 3, 1974 "Conference Call Circuitry for TDM Signal Exchange" and U.S. Patent application Ser. No. 475,682 of Dale Edward Fisk, Merle Edward Homan, Charles Laurie Meiley, Zack Dwayne Reynolds, Robert Vernon Watkins, and Fritz S. Wiedmer filed on June 3, 1974 for "Electric Signal Exchange Switching Circuit Arrangement."

The invention relates to circuitry for telephone and like electronic voice and data communication systems having low level electric signal switching components through which electric signals are translated for distribution among a multiple of terminals, and it particularly pertains to circuitry for translating calling signals through such switching systems.

There are numerous circuit arrangements in the prior art for rotary dial pulse translating and for touch-tone station signalling circuitry. With the advent of the electronic telephone communication systems, combinations of known circuits for handling both rotary-dial and touch-tone calling signals have been proposed. Those proposed arrangement coming closest to the circuitry of the invention of which the inventor is aware are to be found in the following U.S. Pat. Nos.:

| | | | |
|---|---|---|---|
| 3,133,155 | 5/1964 | Kuchas | 179/18 |
| 3,259,697 | 7/1966 | Brumfield etal | 179/16 |
| 3,329,775 | 7/1967 | Kurz | 179/18 |
| 3,453,391 | 7/1969 | Hubbell | 179/16 |
| 3,538,262 | 11/1970 | Gasser etal | 179/18 |
| 3,701,851 | 10/1972 | Starrett | 179/15 BY |

and in German Pat. No.:

| | | | |
|---|---|---|---|
| 1,214,740 | 4/1966 | Wilkin | HO4m |

The patents to Kuchas, Brumfield et al., Kurz, and Hubbell are directed to old rotary dial systems adapted to convert touch-tone dialing signals into pulses for transfer through the old system. Timeout circuitry is used in these systems for recognizing tone call signals and converting them to dial pulses. The latter two patents utilize storage arrangements for translating longer strings of calling signals; the Hubbell patent is directed to an arrangement for faster operation and/or a reduced number of pulses for minimizing the storage required.

The patent to Gasser et al. is directed to a loop system with loop current change responsive circuitry being used rather than timeout circuits in the handling of calling signal information. The patent to Starrett is of interest only in that simultaneous data frequency and voice frequency signals are modulated, demodulated and gated; calling signals are not considered although those skilled in the art will readily derive means for handling such signals.

The German patent is of interest in that it describes a process and apparatus for a telephone switching system wherein multi-frequency tone calling signals are generated in response to selective pulse trains before proceeding with the signal switching operation.

The objects of the invention indirectly referred to hereinbefore and those that will appear as the specification progresses, are attained in a telephone voice and data communications system preferably computer controlled, wherein circuitry is provided for responding to multi-frequency tone calling signals in a manner as conventional as possible while at the same time accommodating circuitry according to the invention for discerning rotary dial pulse calling signals which have been differentiated in passing the direct current blocking circuit components present in the low level alternating current tone calling circuitry. The calling signal circuitry is arranged for counting the differentiated pulses, and electric circuit means for controlling the operation by computer or like control equipment for effecting switching and the translation of audio frequency and/or data pulse signals thereafter through the switching system.

More particularly, according to the invention, a train or rotary dial pulses as differentiated in passing through alternating current handling circuitry of the telephone signal exchange is filtered, threshold detected in circuitry for individually delivering one triggering level at the leading impulse of a dial pulse and another triggering level at the trailing impulse of a dial pulse. An electronic counting circuit is arranged to count the leading impulses delivered by the detector circuitry for a period of time determined by a timeout circuit triggered by the first leading impulse and timing out after the last trailing impulse expected at which time the counting circuit is reset. Another timeout circuit is set by leading impulses and reset by the first timeout circuit. The output of this other timeout circuit is used in the control of the system in the same manner as similar output from a similar timeout circuit in the conventional multi-frequency receiver circuitry. The output of the counting circuit comprises the dialing call signal in digital form exactly as derived from a conventional detecting and coding circuit responding to the multi-frequency receiver. The derived digital calling signals are applied to an OR gating circuit and then to a call bit register of conventional configuration.

More sophisticated circuitry is contemplated for greater reliability in practice. Totally solid state design, operational amplifiers, and digital integrated circuits are contemplated. Control and/or interface circuitry necessary for computer operation is interconnected to provide control potential for the circuit arrangement according to the invention.

Figure 2:
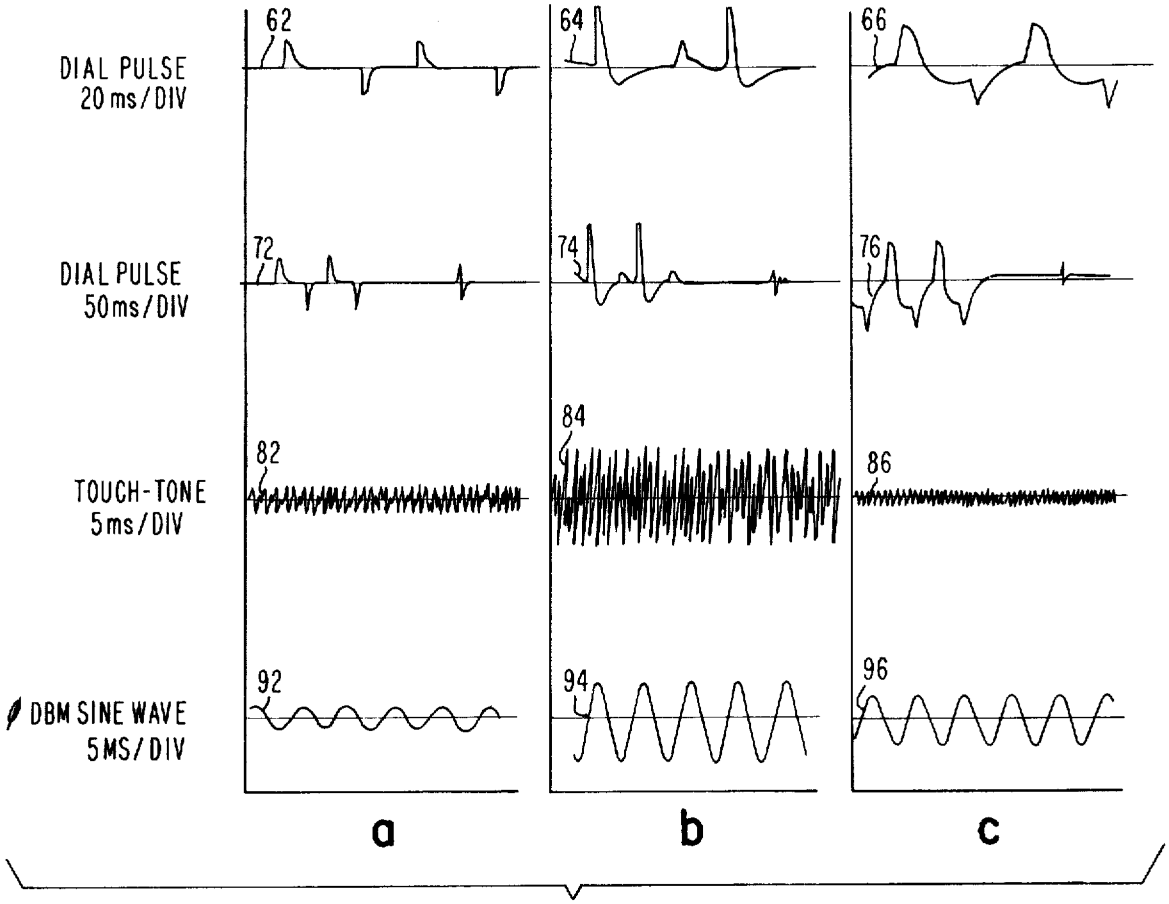
Figure 3:
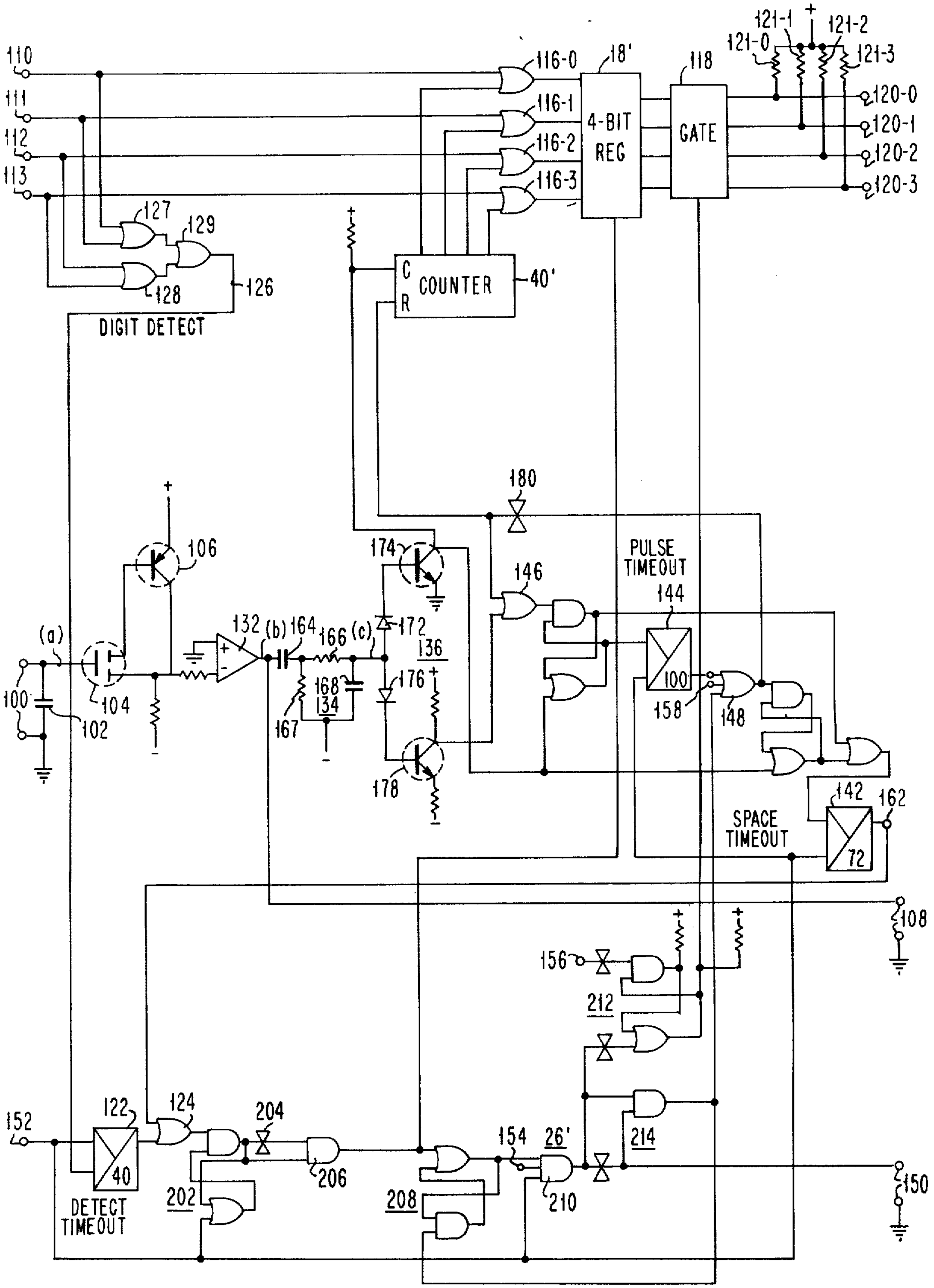

In order that full advantage of the invention obtain in practice, a preferred embodiment thereof, given by way of example only, is described in detail hereinafter with reference to the accompanying drawing, forming a part of the specification, and in which:

FIG. 1 is a functional diagram of a basic circuit arrangement according to the invention;

FIG. 2 comprised of FIGS. *2a–2c* is a graphical representation of waveforms useful in an understanding of the invention; and FIG. 3 is a functional diagram of a preferred circuit arrangement according to the invention as embodied for a telephone voice and data frequency communications terminal system.

A basic arrangement is shown in FIG. 1. A low level alternating current type of telephone communications line or like electric circuitry is connected to input terminals 10. Touch-tone calling signals and/or rotary dial pulse calling signals as differentiated by the alternating current handling circuitry proceeding the terminals 10 appear here as well as voice frequency and/or data pulse train communication signals. A multi-frequency receiver (MFR) 12 of conventional form is connected to the terminals 10 for translating touch-tone calling signals. A conventional multi-frequency-to-digital data converter 14 is connected to the MFR 12 and a multiwire output is applied to a multiple OR gating circuit 16 for application to a register. The conventional touch-tone MFR translates 12 tones to that four-bit register circuitry 18 as shown here. The OR gating circuit 16, of course, is necessary only in a circuit arrangement for processing both types of calling signals. The four-bit register circuitry delivers calling information to output terminals 20-0 through 20-3 under control of a signal originating in the MFR 12. This signal is applied to a timeout circuit 22, the output level of which is passed through an OR gating circuit 24 to interface circuitry 26 for the associated terminal system. From the interface circuitry a control signal is applied over an electric line 28 to the four-bit registry circuitry 18. As thus far described, the circuitry is operable in the conventional touch-tone signalling mode.

Rotary dial pulses are differentiated in the circuitry preceding the input terminals 10. These differentiated rotary-dial pulses are amplified and clipped in a clipping amplifier circuit 32. A low pass filter circuit 34 filters these signals before application to a thresholded detector circuit 36 of conventional form which develops negative going impulses corresponding to the leading edge of the differentiated dial pulses and positive going impulses which correspond to the trailing edge of the differentiated dial pulses. The leading impulses are applied to the counting terminal of a counting circuit 40 having a multiple of output terminals connected to the multiple OR gating circuit 16. A timeout circuit 42 is set by a connection from the leading impulse detector 36 and the output is applied through the OR gating circuit 24 to the interface circuitry 26. The control potential from the system interface 26 is available at terminal 30. Another timeout circuit 44 is set by the leading impulse from the detector circuit 36. This is a reset timeout circuit, reset by a trailing impulse from the detector circuit 36 passing through an OR gating circuit 46 to the reset timeout circuit 44 from which a reset potential is available by way of another OR gating circuit 48 for application to the reset terminal of the counting circuit 40 and to the reset terminal of the reset timeout circuit 44 by way of the OR gating circuit 46 should the trailing impulse not arrive before the reset timeout circuit 44 has timed out. The output terminals 50 supply an electric potential level for the associated unit controller or computer system that indicates a "digit available." This electric level is generated in the interface circuitry 26 which is of conventional components selected for the system at hand. The timeout circuits 22 and 42 are raised individually to indicate that a digit has been detected in either touch-tone or rotary-dial mode and that information is relayed by way of the OR gating circuit 24 through the system interface 26. With a data processor as required by the application at hand, the "digit available" level is then produced for application to an output terminal 50. Input terminals 52 are provided for the system interface 26 for receiving "port address" level from the controller interrupt scanning circuitry that gates the interrupt from the OR gating circuit 24 of the calling digit detecting circuitry. Other input terminals 54 are provided for accepting an electric potential level from the interrupt scanning circuitry for inhibiting the sending of an interrupt by the calling digit detecting circuitry when the controller or computer is busy. Output terminals 56 of the system interface 26 are provided for indicating that a digit has been transmitted and resetting the calling digit detecting circuitry by way of the OR gating circuit 48. Input terminals 58 are provided for resetting the digit detecting system in response to conventional machine reset potential established in the conventional manner.

The timeout circuits 22, 42, and 44 are conventional circuits arranged for bringing up an electric potential level at initiating pulse time and maintaining that level for a predetermined time period after which the circuit is restored to the initial levels. One example of such a timeout circuit that is familiar to those skilled in the art is a "monostable pulse generating circuit" which is sometimes called a "monostable multivibrator." Certain terminology used hereinafter will now be defined using the term "regenerative pulse forming circuit" as a basis. As employed herein, the term "reciproconductive circuit" is construed to include all dual current flow path element (including vacuum tubes, transistors and other current flow controlling devices) regenerative circuit arrangements in which current alternatives in one and then the other of those elements in response to applied triggering impulses. The term "free running multi-vibrator" is sometimes applied to the "astable regenerative pulse forming circuit" which is one in which conduction continuously alternates between the elements after the application of a single triggering pulse (which may be merely a single electric impulse resulting from the application of potential for energizing the circuit). Such an "astable pulse generating circuit" oscillates continuously at a rate dependent on the time constants of various components of the circuit arrangement and/or the applied energizing voltage. The term "monostable regenerative pulse forming circuit" will be used to indicate such a circuit in which a single electric trigger is applied to a single input terminal to trigger the reciproconductive circuit to the unstable state once in return. This monostable version is called a "timeout circuit" when used for that purpose. It is also called a "single-shot circuit" in the vernacular principally because of erosion of an earlier use term "flip-flop" and because it is shorter than the term "self-restoring flip-flop circuit" later used. Timeout circuits frequently have provisions for resetting by the application of an impulse at a time contingent on the operation of the overall circuit regardless of the duration of the unstable state for which the circuit is designed. Timeout circuits 42 and 44 are examples of such circuits. "Bistable regenerative pulse forming circuits" are divided into two principal types. "Bistable regenerative pulse forming circuits" are divided into two principal types. A "binary regenerative pulse forming circuit" has a single input terminal to which electric triggering impulses are applied to alternate the state of conduction each time an impulse is applied. Such a circuit will be referred to as a "binary flip-flop." The "bistable regenerative pulse forming circuit" has two input terminals between which successive triggers must be alternately applied to switch from one stable state to the other. This type of circuit has been called "flip-flop," "lockover circuit," and "latching circuit;" the latter will be used hereinafter.

The MFR 12 is a commercially available unit and will be only briefly described hereinafter as required to show the relationship to the circuitry according to the invention. The MFR 12 has 12 output lines connected to the decoding circuit 14. The latter circuit loads the output from the MFR 12 into a four-bit binary equivalent which is applied to an OR gating circuit 16 and a four-bit register 18. The latter register is gated by the system interface 26 to four output lines terminals 20-0 . . . 20-3 for use by the associated controller. The control line from the MFR 12 is applied to the timeout circuit 22. This control line is frequently termed the "column and row code control line" since it is active whenever the MFR is actuated by one column tone and one row tone, that is, a high frequency tone and a low frequency tone simultaneously. The timeout circuit 22 is arranged to provide a gating level after 40 milliseconds to insure validity of the touch-tone calling signal. The output of the timeout circuit 22 is passed by way of the OR gating circuit 24 to the system interface logic circuitry wherein an electric potential level is generated for presentation at the terminals 50 indicating that an MFR digit is available at the input of the four-bit register.

Rotary dial pulses as appearing at input terminals 10 are in the form of differentiated pulses as represented graphically by a curve 62 in FIG. 2. As previously stated, the differentiation is due to direct current blocking components in the preceding circuitry which is conventional in electronic telephone and data communication systems. The differentiated rotary dial pulses are amplified and clipped in a clipping amplifier circuit 32 delivering an output waveform graphically represented by a curve 64. The 5 Hz low pass filter 34 removes extraneous noise frequency components to produce a dial pulse waveform graphically represented by a curve 66. The progress of a similar dial pulse having a predominant noise glitch is graphically represented by curves 72, 74, and 76. A comparison of the effect on the two dialing digit waveforms is afforded by curves 82, 84, and 86 graphically representing a touch-tone composite signal of 1209 and 697 Hz. Three corresponding curves 92, 94, and 96 graphically represent a 100 Hz pure sign wave reference signal. For the curves 62 . . . 96, as shown, the threshold detector circuit 36 is arranged to separate negative going leading impulses and positive going trailing impulses at threshold levels of ±1.2 volts.

The complementary output waveform at terminals 60 of the timeout circuit 44 is a reset electric level above the reference level and represents $\overline{\text{Dial Pulse}}$ (not dial pulse). Therefore, if a pulse, or an impulse, is received that is not a true dial pulse, the terminal 60 will be at the UP level with respect to the point of reference potential. If valid dialing impulses are received, they are counted until the end of the pulse train is detected and the terminal 62 of the timeout circuit 42 is at the UP level indicating that the digit is complete and translating that information to the system interface 26.

The logical circuitry in the system interface 26 upon receiving a "digit detected" signal from the OR gating circuit 24 as the result of either an MFR tone or a rotary dial pulse train delivers a gating pulse at the terminals 28 for application to the four-bit register 18 for capturing the detected digit and interrupting the controller at the proper time determined by signals applied at terminals 52 and 54. After interrupting the controller and delivery the dialing digits, the terminal 56 of the system interface 26 is raised indicating that the digit has been transmitted and the rotary dial digit detecting circuit is reset by way of the OR gating circuit 48.

The output of the counter 40 is four-bit digit, on four wires indistinguishable from the four-bit digits obtained by way of the MFR 12. The controller and other utilization circuitry responds exactly the same way to the MFR touch-tone originated digits or rotary dial originated dialing digits; no indication as to which of the two types of dialing information was received is indicated or is necessary.

In FIG. 3 the basic circuit arrangement according to the invention is incorporated in a circuit arrangement for a particular application, which circuit arrangement is shown in greater detail in order to illustrate the flexibility of the circuit arrangement of the invention. The audiofrequency signal as obtained from the switching port including rotary dial pulses or touch-tone calling digits is applied at input terminals 100. The signals are amplified by circuitry comprising a field effect transistor (FET) 104 and a bipolar transistor 106 followed by a differential clipping amplifier 132. The output of the amplifier 132 is applied at output terminals 108 for use as a test point, or for applying the signals to an MFR, as desired for the application at hand. The MFR is not shown in this diagram, but the decoded output is presented to terminals 110 . . . 113 which are connected to OR gating circuits 116-0 . . . 116-3 for application to a four-bit register 18' substantially in the previously described embodiment. The output of the four-bit register is gated by means of an analog gate 118. The calling digit is presented as positive going electric levels on output terminals 120-0 . . . 120-3 as developed across load resistors 121-0 . . . 121-3. The "column and row decoding circuit" is functionally replaced by three OR gating circuits 127, 128, 129 leading to a "digit detected" line 126.

The output of the clipping amplifier circuit 132 is applied to a 5 Hz low pass filter comprising a coupling capacitor 164, two resistors 166 and 167 and a filter capacitor 168. The output of the filter 134 is applied to a threshold detector circuit 136. This circuit comprises two diodes 172 and 176, oppositely poled and not necessarily of the same rating since the negative excursions may differ from the positive excursions of the differentiated rotary dial pulses. The diode 172 is connected to a transistor 174 having the collector electrode connected to the counting terminal of the counter 40'. The diode 176 is connected to another transistor 178 having the collector electrode connected to an OR gating circuit 146 for developing reset potential at the output of an OR gating circuit 148. A timeout circuit 144, essentially the same as the aforementioned timeout circuit 44, is interposed between the OR gating circuits 146 and 148. Also, the later circuit 148 has a provision for accepting a conventional reset signal at an input terminal 158, essentially as the case for the OR gating circuit 48 and the terminal 58 previously described. The latter is connected by means of an inverting circuit 180 to the reset terminal of the counter 45 and the OR gating circuit 146.

Values of pertinent components for a specific application along the lines of the circuitry in FIG. 3., by way of example only, are given below:

| Ref. Nr. | Component | Type or Value |
|---|---|---|
| 102 | Capacitor | 470 picofarads |

-continued

| Ref. Nr. | Component | Type or Value |
|---|---|---|
| 104 | FE Transistor | 3N140 |
| 106 | Transistor | 2N3906 |
| 132 | IC Amplifier | 741 |
| 164 | Capacitor | 10 microfarads |
| 166 | Resistor | 4.3 Kilohms |
| 167 | " | 100. Kilohms |
| 168 | Capacitor | 10 microfarads |
| 172 | Silicon diode | AL |
| 174 | Transistor | 2N3904 |
| 176 | 3 Silicon diodes in series | AL |
| 178 | Transistor | 2N3904 |

A digit detect line 126 emanating from the MFR by way of three OR gating circuits 127, 128, and 129, connected as the equivalent of one multiple OR gating circuit, is applied to reset a timeout circuit 122 having an output lead connected to an OR gating circuit 124 to which the output of a timeout circuit 142 at output terminals 162 is connected. The interface circuitry 26' comprises three latching circuits and three AND gating circuits which are to be described in greater detail below.

An output signal from the timeout circuit 122 indicates a valid M.F. digit and an output from the timeout circuit 142 indicates a valid rotary dial digit. Either such signal passing through the OR gating circuit 124 sets a latch 202 when there is no polling signal at the input terminals 152— which would hold the latch 202 in the reset condition. An output level change at the set latch 202, produces a short electric pulse at the output of a monopulsing circuit comprising an inverting circuit 204 and and AND gating circuit 206. This electric pulse is applied to the four-bit register 18' as a digit strobing pulse and to another latch 208 as a setting pulse.

With the latch 208 set, the interrupt polling terminal 152 active and the interrupt masking terminal 154 inactive, an AND gating circuit 210 presents a level at the "digit available" terminal 150 to the associated controller or computer and sets a latch 212. The latter latch 212 enables the gating circuit 118 to pass a digit from the register 18' to the controller or computer by way of the terminals 120-0 . . . 120-3.

When the interrupt polling terminal 152 level drops, the AND gating circuit 212 is deactivated and the level at the terminal 150 also drops. At the same time a monopulsing circuit 214, similar to the one comprising the inverting circuit 204 and AND gating circuit 206, passes a pulse to reset the latch 208 and reset the digit receiving logic by way of the OR gating circuit 148.

When the digital data at the output terminals 120-0 . . . 120-3 has been accepted by the controller or computer, the terminal 156 will be raised and the latch 212 reset which will drop the level to the gating circuit 118. The latch 202 is reset when the condition indicative of a digit changes; the monopulsing circuit 204–206 is not triggered at this active-to-inactive transition which takes place in 20 microseconds. The logical circuit arrangement is again ready for translating an incoming digit.

While the invention has been shown and described particularly with reference to the preferred embodiment thereof and alternatives have been described, it should be understood that those skilled in the art will make further changes without departing from the spirit and scope of the invention as defined in the appended claims.

The invention claimed is:

1. A telephone calling signal translating circuit arrangement for a telephone signal exchange having alternating current handling circuitry in which rotary dial pulses are differentiated comprising input terminals at which a train of such differentiated rotary dial pulses is applied, detector circuitry having an input circuit coupled to said input terminals and having two output terminals, one of said output terminals delivering a triggering pulse at the leading impulse of a pulse of said train of pulses differentiated at said input terminals and the other of said output terminals delivering a triggering pulse at the trailing impulse, counting circuitry having a counting input terminal connected to said one output terminal of said detector circuitry for counting said pulses, a reset terminal and output count terminals, a timeout circuit having a set terminal connected to said one output terminal of said detector circuitry, having a reset terminal coupled to said other output terminal of said detector circuitry, and having an output terminal coupled to said reset terminal of said counting circuitry for halting the count therein regardless of any succeeding pulse, thereby to present telephone dialing digital information at said output count terminals of said counting circuitry corresponding to said differentiated pulse calling signal.

2. A telephone calling signal translating circuit arrangement as defined in claim 1 and wherein said detecting circuit is a thresholding detector circuit.

3. A telephone calling signal translating circuit arrangement as defined in claim 1 and incorporating a clipping amplifying circuit and a low pass filter interposed in cascade between said input terminals and said detecting circuit.

4. A telephone calling signal translating circuit arrangement as defined in claim 1 and incorporating another timeout circuit having a set terminal connected to said one output terminal of said detector circuitry, a reset terminal coupled to the reset terminal of the first said timeout circuit, and an output terminal delivering an electric potential level at the first leading impulse of a said train of pulses.

5. A telephone calling signal translating circuit arrangement as defined in claim 4, and incorporating an OR gating circuit having an input lead connected to said other output terminal of said detector circuitry, another input lead coupled to the output of the first said timeout circuit and an output lead connected to the reset terminal of the first said timeout circuit.

6. A telephone calling signal translating circuit arrangement as defined in claim 4 and incorporating another OR gating circuit interposed in the connection between said output terminal of the first said timeout circuit and said reset terminal of said counting circuitry, and having at least another input lead available for applying another reset pulse for resetting said translating circuit arrangement despite inoperation of the first said timeout circuit.

7. A telephone calling signal translating circuit arrangement as defined in claim 1 and incorporating a conventional multi-frequency receiver having input terminals connected to the first said input terminals, tone signal output terminals, and an output terminal delivering a column and row control signal of conventional form, a conventional decoding circuit having input leads connected to said tone signal output leads and digital information delivering output terminals, a timeout circuit having an input terminal connected to said column and row control output terminal and an output terminal, a further OR gating circuit having an input lead connected to said output terminal of said further timeout circuit, another input lead connected to said output terminal of said other timeout circuit and an output terminal delivering a level to associated control system interface circuitry, multiple OR gating circuitry having a number of input leads connected to said digital information delivering output terminals of said decoding circuit, a like number of input leads connected to said output count terminals of said counting circuitry, and a like number of output terminals, a digital information register having input terminals connected to said output terminals of said multiple OR gating circuitry and having output terminals at which said digital calling information is presented.

8. A telephone calling signal translating circuit arrangement as defined in claim 7 and incorporating a multiple bit digital gating circuit connected to said register and having a gating control terminal for buffering the output of said register to the associated control system.

* * * * *